United States Patent
Karlsson

(10) Patent No.: US 7,353,008 B2
(45) Date of Patent: Apr. 1, 2008

(54) METHOD AND SYSTEM FOR OPTIMIZING DECIBEL DATA CONVERSION

(75) Inventor: Lars Karlsson, Santa Clara, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 151 days.

(21) Appl. No.: 11/416,294

(22) Filed: May 1, 2006

(65) Prior Publication Data

US 2006/0276136 A1    Dec. 7, 2006

Related U.S. Application Data

(63) Continuation-in-part of application No. 10/829,858, filed on Apr. 21, 2004, now abandoned, and a continuation-in-part of application No. 11/201,164, filed on Aug. 11, 2005, and a continuation-in-part of application No. 11/201,144, filed on Aug. 11, 2005, now abandoned.

(60) Provisional application No. 60/677,703, filed on May 3, 2005.

(51) Int. Cl.
*H04L 27/00* (2006.01)
*H04B 1/18* (2006.01)

(52) U.S. Cl. .......... 455/150.1; 455/142; 455/313; 375/256

(58) Field of Classification Search .......... 455/150.1, 455/142, 313, 323, 334, 315, 317, 324; 375/256, 375/132, 133, 138
See application file for complete search history.

(56) References Cited

U.S. PATENT DOCUMENTS

| | | | |
|---|---|---|---|
| 5,197,024 A * | 3/1993 | Pickett | 708/517 |
| 5,524,281 A * | 6/1996 | Bradley et al. | 455/67.15 |
| 6,292,654 B1 * | 9/2001 | Hessel et al. | 455/223 |
| 6,735,264 B2 * | 5/2004 | Miller | 455/501 |
| 7,265,691 B2 * | 9/2007 | Tomic | 455/67.11 |
| 2003/0016823 A1 * | 1/2003 | Chung | 455/67.11 |
| 2005/0273483 A1 * | 12/2005 | Dent | 708/490 |

* cited by examiner

*Primary Examiner*—Lana Le

(57) ABSTRACT

A Method and System for Optimizing Decibel Data Conversion. This invention provides an ability to convert linear signals into decibel units via digital logic circuitry. The resultant system can present information to users in real-time. This is made possible by performing an approximation function that is simple enough to be implemented directly in digital hardware, rather than through software executed by massive computing resources. An exemplary application for this technology is as a component of a surgical reactive electronic jamming system. This invention allows a surgical reactive jammer to determine precisely the correct jamming thresholds to apply in real-time. It allows signal surveillance equipment to survey the spectrum and display those results in dBm with far more efficiency than before. Finally, it enables a whole industry of communications related devices that need to do real time decibel conversion.

3 Claims, 2 Drawing Sheets

METHOD AND SYSTEM FOR OPTIMIZING DECIBEL DATA CONVERSION

This application is a continuation-in-part of application Ser. No. 10/829,858, filed Apr. 21, 2005 now abandoned, and Ser. No. 11/201,164, filed Aug. 11, 2005, and Ser. No. 11/201,144, filed Aug. 11, 2005 now abandoned.

This application is filed within one year of, and claims priority to Provisional application Ser. No. 60/677,703, filed May 3, 2005 now abandoned.

BACKGROUND OF THE INVENTION

1. Field of the Invention

This invention relates to electronic signal processing and analysis and, more specifically, to a Method and System for Optimizing Decibel Data Conversion.

2. Description of Related Art

The method and system of this invention relates to an enhanced technique to convert digitized power measurements (such as 20 log(X)) into dB. As mentioned, the invention of this patent application is an extension to a previously filed U.S. patent application Ser. No. 10/829,858: "Method And Apparatus For The Intelligent And Automatic Gathering Of Sudden Short Duration Communications Signals," also conceived by this inventor.

The decibel (dB) is commonly used to measure sound level, but it is also widely used in electronics, signals and communication. The dB is a logarithmic unit used to describe a ratio. The ratio may be power, sound pressure, voltage or intensity or several other things.

In frequency analysis environments, rapid dB conversion is an important capability in that the speed (or lack thereof) of conversion will improve or degrade the overall speed of the frequency analysis. In particular, for Electronic Countermeasure Systems, where short burst, frequency-hopping transmitters are sought to be detected, characterized and then jammed, dB conversion rate (and of course accuracy) becomes of critical importance. With logarithmic values (dB), subsequent processing of the signal data can be made by additions and subtractions rather than multiplications.

Prior art methods of decibel conversion used either floating point calculations or standard lookup tables to calculate the dB's. Both of these methods are brute force approaches, which require large resources and/or many clock cycles of the processor logic, thus take a lot of processing time or large hardware resources.

SUMMARY OF THE INVENTION

In light of the aforementioned problems associated with the prior devices and methods it is an object of the present invention to provide a Method and System for Optimizing Decibel Data Conversion.

The necessity to convert real world linear signal levels to decibels in modern communications system design is well known. This invention provides an ability to do that in digital logic with minimal use of resources. The result is a system that can present information to users in real time. This is made possible by performing an approximation function that is simple enough to be implemented directly in digital hardware, rather than through software executed by massive computing resources.

This invention allows, for example, a surgical reactive jammer to determine precisely the correct jamming thresholds to apply in real time. It allows signal surveillance equipment to survey the spectrum and process those results in dBm with far more efficiency than before. Finally, it enables a whole industry of communications related devices that need to do real time decibel conversion.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Method and System for Optimizing Decibel Data Conversion.

The parent applications to this patent application, namely, Ser. No. 10/829,858, filed Apr. 21, 2004 for "Method and Apparatus for the Intelligent and Automatic Gathering of Sudden Short Duration Communications Signals" and two of its continuation-in-part applications, namely, Ser. No. 11/201,164 filed Aug. 11, 2004 for "Improved Method and Signal Intelligence Collection System That Reduces Output Data Overflow in Real-Time", and Ser. No. 11/201,144 filed Aug. 11, 2004 for "Method and Technique For Gathering Signal Intelligence of All Radio Communications Only Originating From Specific Selected Areas" describe preferred application environments for the optimized dB conversion method utilized by the present invention. The disclosures contained within those three parent applications are incorporated herein by reference, and may be referred to as the "parent applications" later in this document.

Figure 1:
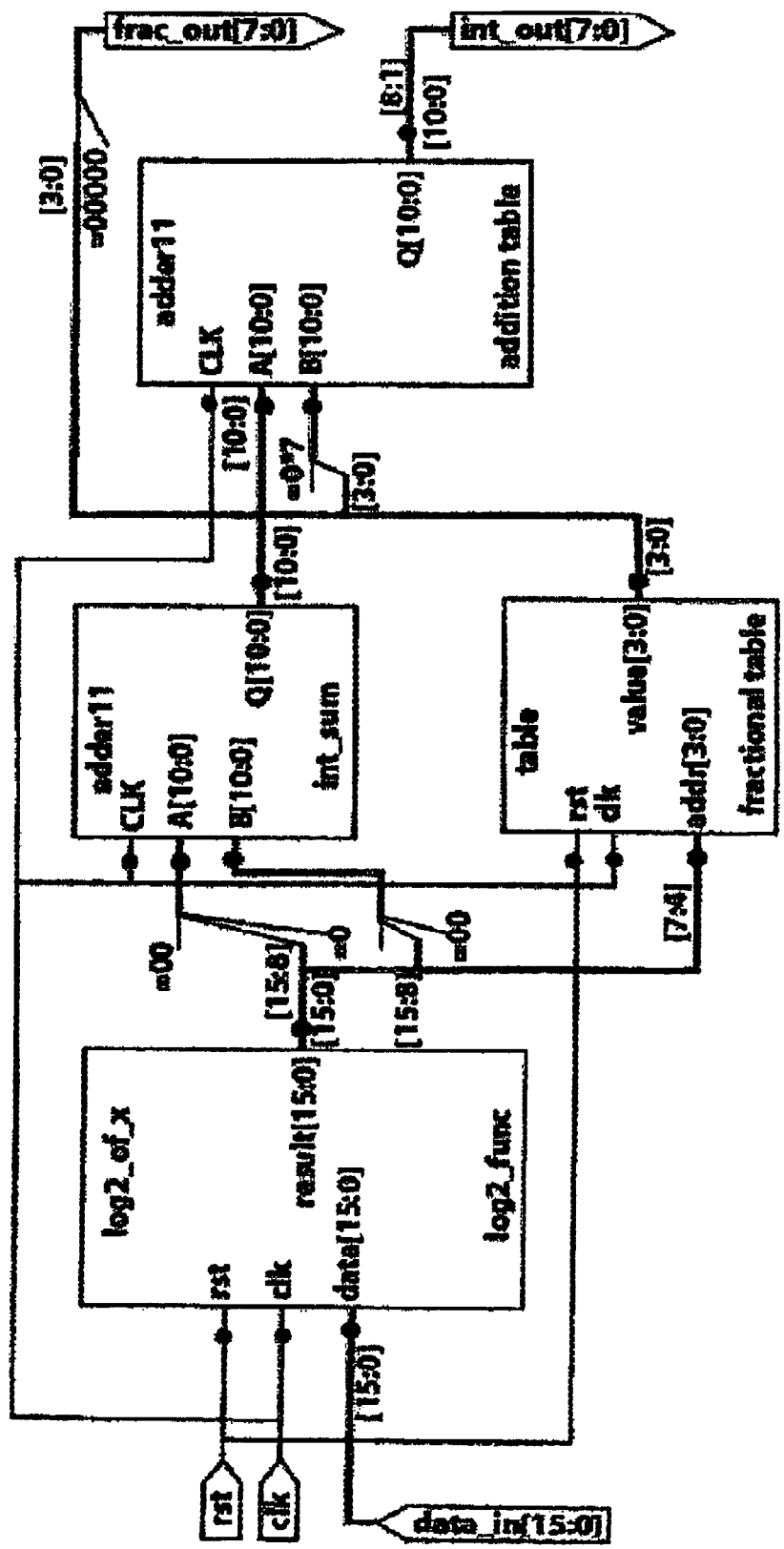
FIG. 1 is a block diagram of the method of the present invention as it might be implemented in digital device/logic.

The present invention can best be understood by initial consideration of FIG. 1. FIG. 1 is a block diagram of the method of the present invention as it might be implemented in digital device/logic.

The method of the present invention makes an approximation of the 20*log(X) function, and thus speeds up the conversion. The goal is to make the dB conversion in real time, with sufficient accuracy, and without using large lookup tables or any floating-point calculations. One application is, for example, when all the output bins from an FFT must be converted to dBm in real time.

This real-time technique does not use any floating-point technology. Rather, this technique can be implemented directly in the digital logic hardware such as field programmable gate arrays (FGPA's), for fast, real-time results using a minimum of resources.

The present invention describes a much more enhanced way to perform this dB conversion in real time, using only shifts and adds. The result is that the entire conversion calculation can be performed in 1 to 3 clock cycles in the digital logic. This is extremely important for any system that desires to make dB conversions in real time for use in automated decision-making or, even to present the real-time result to a user.

Figure 2:
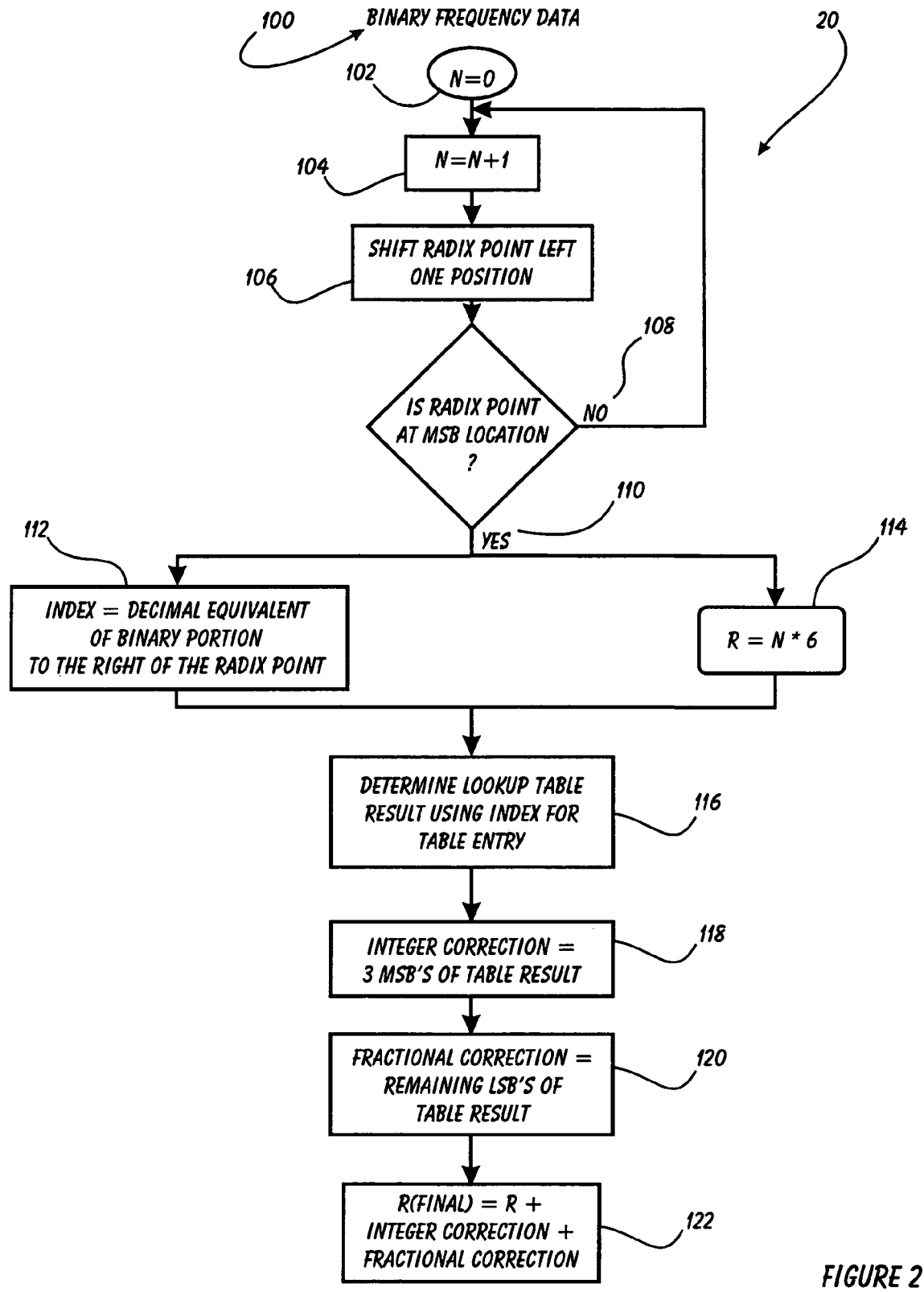
FIG. 2 is a flowchart depicting the dB conversion method employed by the present invention.

The invention of this patent application can be applied to many communications systems applications such as real-time jamming, or real-time spectrum displays. The method of this invention is unique in its ability to perform dB calculation operations in real-time by clever approximation. Thus it brings efficiency to all digital communication systems such as those from the Signal Intelligence and Electronic Warfare industries. FIG. 2 provides detail regarding the novel and nonobvious method of the present invention.

The method utilizes the fact that 6*log2(X) is very close to 20*log10(X), so that by adding in a specially-constructed correction table, a high resolution can be achieved using only very small resources compared to the full lookup table that normally would be required to reach real-time speed with reasonable resolution. The resulting resolution is within a fraction of a dB compared to just 6 dB with just plain binary shifting.

Methodology

FIG. 2 is a block diagram of the preferred method of conversion 20. The incoming linear binary frequency data 100 arrives at the system for conversion. The first step is to implement an log 2(X) core by right shifting the binary value until the most significant bit (MSB) is at bit 0 or least significant bit (LSB) position (steps 104, 106 and 108 repeated until Radix point at MSB location 110).

The shifted out part is saved in a separate register. Second is to multiply the number of right shifts by 6 using left shifts and additions 114 (saves resources). Third is to use the shifted out part to do a lookup in a small table 116 and then add in the 3 most significant bits from the table result 118. That gives the integer DB result. The remaining right part of the table output is the fractional dB result 120.

The final dB result is a sum of the table result, the integer correction and the fractional correction 122.

The size of the table is dependent upon the desired resolution. The following are some matlab examples of the formulas required to generate the tables.

dec2bin(1*((round (20*log 10(8:15)*1)/1)−18))=3 bit, 8 values, 1 dB resolution dec2bin(2*((round (20*log 10(16:31)*2)/2)−24))=4 bit, 16 values, 0.5 resolution dec2bin(4*((round (20*log 10(32:63)*4)/4)−30))=5 bit, 32 values, 0.25 resolution dec2bin(8*((round (20*log 10(64:127)*8)/8)−36))=6 bit, 64 values, 0.12 resolution

EXAMPLE dec2bin(2*((round (20*log10(16:31)*2)/2)−24)) Generates this sequence of 16, 4-bit values: 0000, 0001, 0010, 0011, 0100, 0101, 0110, 0110, 0111, 1000, 1001, 1001, 1010, 1010, 1011, 1100.

Operation

Following are two example calculations that show how the method is used. The first example shows conversion of a straight binary value. The second example shows how to convert the outputs from an unscaled FFT or a binary value that has been averaged with the fractional part preserved. The first example is using the 4 bit table, the second example is using the 6 bit table from the above formula.

Example 1

(4-bit Table)

Step 1: get X=30.

0000_0000_0000_0000_0001_1110

Ȓadix point (no averaging)

Step 2: shift the number to the right (count the number of shifts)=4 shifts.

000_0000_0000_0000_0000_0001 1110   Fractional result = 14.

Ȓadix point

Use the fractional part (14) as index in the lookup table, result=1011.

Step 3: multiply # of shifts by 6 (24=0001_1000) and the most-significant 3 bits from the table data (5=101x) and the result is 29. The least significant bit from the table is the fractional dB so the total result is 29.5 dB.

Example 2

(6-bit Table)

Step 1: get the averaged X=7 plus fractions =7.3125

0000_0000_0000_0000_0000_0111_0101

Ȓadix point (averaging of 16)

Step 2: shift to the right (count the number of shifts) =2 shifts.

0000_0000_0000_0000_0001 11_0101   Fractional result = 53

Ȓadix point

Use the fractional part (53) as index in to the lookup table, result =43=101011

Step 3: multiply # of shifts by 6 (12=0000_1100) and add the most significant 3 bits from the table data (5=101xxx) the result is 17. The 3 least significant bits 011 from the table are the fractional dB 0+0.25+0.125 so the total result is 17.375 dB.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for converting linear signal levels into decibel units, the method being executed on a digital circuitry device comprising logarithmic computing means in electrical communication with addition means and table lookup means, the method comprising the steps of:

shifting a radix point of incident linear signal data in binary form to a most significant bit of said linear signal data by shifting said radix point N bits;

determining a base result via said logarithmic computing means as 6 times N;

determining a decimal equivalent of said shifted linear signal data to the right of said radix point via said logarithmic computing means;

determining an integer correction via said table lookup means using said decimal equivalent as input data, said integer correction being the three Most Significant Bits of said table result;

adding said integer correction to said base result to create an integer-corrected result; and creating a final result in decibels by adding a fractional correction to said integer-corrected result, said fractional correction being the remaining Least Significant Bits of said table result.

2. A signal intelligence system, comprising:

a surveillance receiver for receiving RF signals across a broad spectrum;

a digitizer for creating a continuous stream of digitized data representing said received RF signals;

digital data conversion means for converting said digitized data into frequency bins, said digital data conversion means comprising decibel conversion means for converting linear data into decibel units, said decibel conversion means comprising a method executed by a conversion system comprising logarithmic computing means in electrical communication with addition means and table lookup means, said method comprising the steps of:

shifting a radix point of incident binary frequency data to a most significant bit of said binary frequency data by shifting said radix point N bits;

determining a base result via said logarithmic computing means as 6 times N;

determining a decimal equivalent of said shifted binary frequency data to the right of said radix point via said logarithmic computing means;

determining an integer correction via said table lookup means using said decimal equivalent as input data, said integer correction being the three Most Significant Bits of said table result;

adding said integer correction to said base result to create an integer-corrected result; and creating a final result by adding a fractional correction to said integer-corrected result, said fractional correction being the remaining Least Significant Bits of said table result;

comparing means for comparing each said bin to data stored in a data repository;

buffer means for buffering said digitized data;

digital receiver means for receiving a narrow band of said buffered digitized data; and trigger means responsive to said comparing, for triggering said digital receiver means to tune to a frequency of interest.

3. A method for analyzing RF signal transmissions comprising the steps of:

detecting an analog RF signal transmission;

digitizing said detected RF signal;

buffering said digitized signal;

converting said digitized signal into frequency bins via digital data conversion means, said digital data conversion means comprising decibel conversion means for converting linear data into decibel units, said decibel conversion means comprising a method executed by a conversion system comprising logarithmic computing means in electrical communication with addition means and table lookup means, said method comprising the steps of:

shifting a radix point of incident binary frequency data to a most significant bit of said binary frequency data by shifting said radix point N bits via said logarithmic computing means;

determining a base result via said logarithmic computing means as 6 times N;

determining a decimal equivalent of said shifted binary frequency data to the right of said radix point via said logarithmic computing means;

determining an integer correction via said table lookup means using said decimal equivalent as input data, said integer correction being the three Most Significant Bits of said table result;

adding, via said addition means, said integer correction to said base result to create an integer-corrected result; and creating a final result by adding, via said addition means, a fractional correction to said integer-corrected result, said fractional correction being the remaining Least Significant Bits of said table result;

comparing said frequency bins to known frequency bin data; and triggering a digital receiver to receive said buffered data, said triggering responsive to said comparing.

* * * * *